(12) United States Patent
Abe et al.

(10) Patent No.: US 8,663,832 B2
(45) Date of Patent: Mar. 4, 2014

(54) CELL FOR REDUCING SHORT CIRCUIT AND BATTERY INCORPORATING THE CELL

(75) Inventors: Takaaki Abe, Yokohama (JP); Kazuki Miyatake, Yokohama (JP); Osamu Shimamura, Yokohama (JP); Masakazu Kobayashi, Yokosuka (JP); Hideaki Horie, Yokosuka (JP); Kyoichi Watanabe, Yokohama (JP); Yoshio Shimoida, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1384 days.

(21) Appl. No.: 12/190,133

(22) Filed: Aug. 12, 2008

(65) Prior Publication Data

US 2009/0047575 A1    Feb. 19, 2009

(30) Foreign Application Priority Data

Aug. 15, 2007 (JP) ................................. 2007-211988
Aug. 15, 2007 (JP) ................................. 2007-211989
Nov. 9, 2007 (JP) ................................. 2007-292446

(51) Int. Cl.
*H01M 2/14* (2006.01)
*H01M 2/16* (2006.01)
*H01M 2/18* (2006.01)

(52) U.S. Cl.
USPC ........... 429/129; 429/130; 429/141; 429/142; 429/143; 429/144

(58) Field of Classification Search
None
See application file for complete search history.

(56) References Cited

U.S. PATENT DOCUMENTS 7,968,221 B2 * 6/2011 Hatanaka et al. ........... 429/94
2005/0084760 A1 * 4/2005 Hwang et al. ............... 429/234

FOREIGN PATENT DOCUMENTS

| CN | 1823436 A | 8/2006 |
| EP | 1 067 611 A1 | 1/2001 |
| JP | 09-120818 | 5/1997 |
| JP | 09-213338 | 8/1997 |
| JP | 2003-243038 A | 8/2003 |
| WO | 2006/080687 A1 | 8/2006 |
| WO | WO2007072833 * | 6/2007 |

OTHER PUBLICATIONS

Machine translation of JP 09-213338, Nakai et al., Aug. 15, 1997.*

* cited by examiner

*Primary Examiner* — Kwang Han
(74) *Attorney, Agent, or Firm* — Young Basile

(57) ABSTRACT

Disclosed is a cell with a power-generating element and an outer package. The power-generating element includes a unit cell layer including a first electrode, a second electrode and an electrolyte layer disposed between the first and second electrodes. In the first electrode, a first collector is provided with one of a positive electrode active material layer and a negative electrode active material layer. In the second electrode, a second collector is provided with the other one of the positive and negative electrode active material layers. The first and second collectors have thicknesses such that when a conductor from outside penetrates at least two cells and a short circuit is formed between two cells via the conductor, shorted portions of the first and second collectors are fused by the heat generated by the current before the temperature of the cells reaches a predetermined value so that the short circuit is blocked.

17 Claims, 6 Drawing Sheets

CELL FOR REDUCING SHORT CIRCUIT AND BATTERY INCORPORATING THE CELL

CROSS REFERENCE RELATED TO APPLICATIONS

This application claims priority to Japanese Patent Application Serial Nos. 2007-211988, filed Aug. 15, 2007, 2007-211989, filed Aug. 15, 2007, and 2007-292446, filed Nov. 9, 2007, each of which is incorporated herein in its entirety by reference.

TECHNICAL FIELD

The present invention relates to a cell including positive electrodes and negative electrodes alternately stacked and a battery incorporating the cell.

BACKGROUND

It is desired to reduce the amount of carbon dioxide emitted in an effort to reduce air pollution and slow down global warming. The automobile industry has introduced electric-powered cars (hereinafter "EV") and hybrid cars (hereinafter "HEV") to reduce the amount of the carbon dioxide emission, attracting considerable attention. Motor-driving secondary batteries are key to the practical application of these vehicles, and their development is now being actively pursued.

Non-aqueous electrolyte cells (also known as non-aqueous solvent-type secondary cells), in particular, lithium ion secondary cells, have the highest theoretical energy among all types of cells and have attracted much attention as motor-driving secondary cells. As such, their development is now being accelerated.

A typical lithium ion secondary cell includes a layered structure (power-generating element) including a positive electrode, a negative electrode, and an electrolyte layer connecting the positive electrode to the negative electrode. The power-generating element is usually packaged with a metal-resin laminate sheet constituted from a lightweight metal foil such as an aluminum foil and resin sheets laminated on both surfaces of the foil so that the electrode terminals project externally.

As for the collectors of the lithium ion secondary cell electrodes, a metal foil such as an aluminum foil is usually used as a positive electrode collector and a metal foil such as a copper foil is usually used as a negative electrode collector, for example.

Japanese Unexamined Patent Application Publication No. 2003-243038 discloses a lithium ion secondary battery in which, in the event of internal short circuit, the aluminum thin film is heated by the short circuit current flowing in the shorted part and the aluminum atoms diffuse to allow recovery of insulation in the shorted part to thereby prevent the temperature of the cell from increasing. However, when two or more cells are connected in series to form a battery and a short circuit occurs between the cells, the flow of the short circuit current continues even after insulation is recovered in the shorted part of the positive electrode. The cell temperature elevates as a result, and the cell may undergo breakdown.

BRIEF SUMMARY

Disclosed are embodiments of a cell that can block the flow of a short circuit current even when short circuits occur between two or more cells.

One embodiment of a cell disclosed herein comprises a power-generating element including at least one unit cell layer and an outer package configured for packaging the at least one unit cell layer. Each unit cell layer comprises a first electrode having a first collector and one of a positive electrode active material layer and a negative electrode active material layer, and a second electrode having a second collector and the other one of the positive electrode active material layer and the negative electrode active material layer. An electrolyte layer is disposed between the first electrode and the second electrode. The first collector and the second collector each has a thickness such that when a conductor from outside penetrates at least two unit cell layers and forms a short circuit between the at least two unit cell layers, each shorted portion of the first and second collectors fuse from heat generated by the short circuit before a temperature of the unit cell layers reaches a predetermined value so that the short circuit is blocked.

Also disclosed is a battery comprising a plurality of cells according to the embodiments taught herein connected in series.

Also disclosed is a vehicle comprising the battery made of cell embodiments disclosed herein as a motor-driving power source.

Other applications of the invention taught herein will become apparent to those skilled in the art when the following description is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Certain embodiments of a cell according to the invention are now described. It should be understood here that the scale of the drawings is altered for convenience of explanation and does not necessarily represent actual dimensions.

The type of the cell disclosed herein may vary. For example, it may be a non-aqueous electrolyte cell. With respect to the type of structure and configuration of the non-aqueous electrolyte cell, the invention is applicable to any of the known structures including laminated (flat) cell, rolled (cylindrical) cell, and the like.

The form of electrolyte of the non-aqueous electrolyte cell is also not particularly limited. For example, the invention is applicable to any one of liquid electrolyte cells in which separators are impregnated with non-aqueous electrolytic solutions, polymer gel electrolyte cells (a.k.a., polymer cells), and solid polymer electrolyte cells (all-solid electrolyte cells). The polymer gel electrolytes and solid polymer electrolytes can be used by themselves or by being impregnated in separators.

Furthermore, the cell disclosed herein may be a primary cell or a secondary cell. The electrode materials of the cells and the metal ions moving between the electrodes are also not particularly limited, and the invention is applicable to any known electrode materials. For example, the invention is applicable to lithium ion secondary cells, sodium ion secondary cells, potassium ion secondary cells, nickel hydride secondary cells, and nickel cadmium secondary cells. Lithium ion secondary cells are of particular interest due to their high voltage, making them suitable for use in the EV and HEV vehicles described above. The lithium ion secondary cell achieves high energy density and high output density particularly suited to driving power supplies and auxiliary power supplies of vehicles.

Therefore, although a lithium ion secondary cell is described below as a representative embodiment of the invention disclosed herein, the technical scope of the invention is not limited to the embodiment described below.

Figure 1:
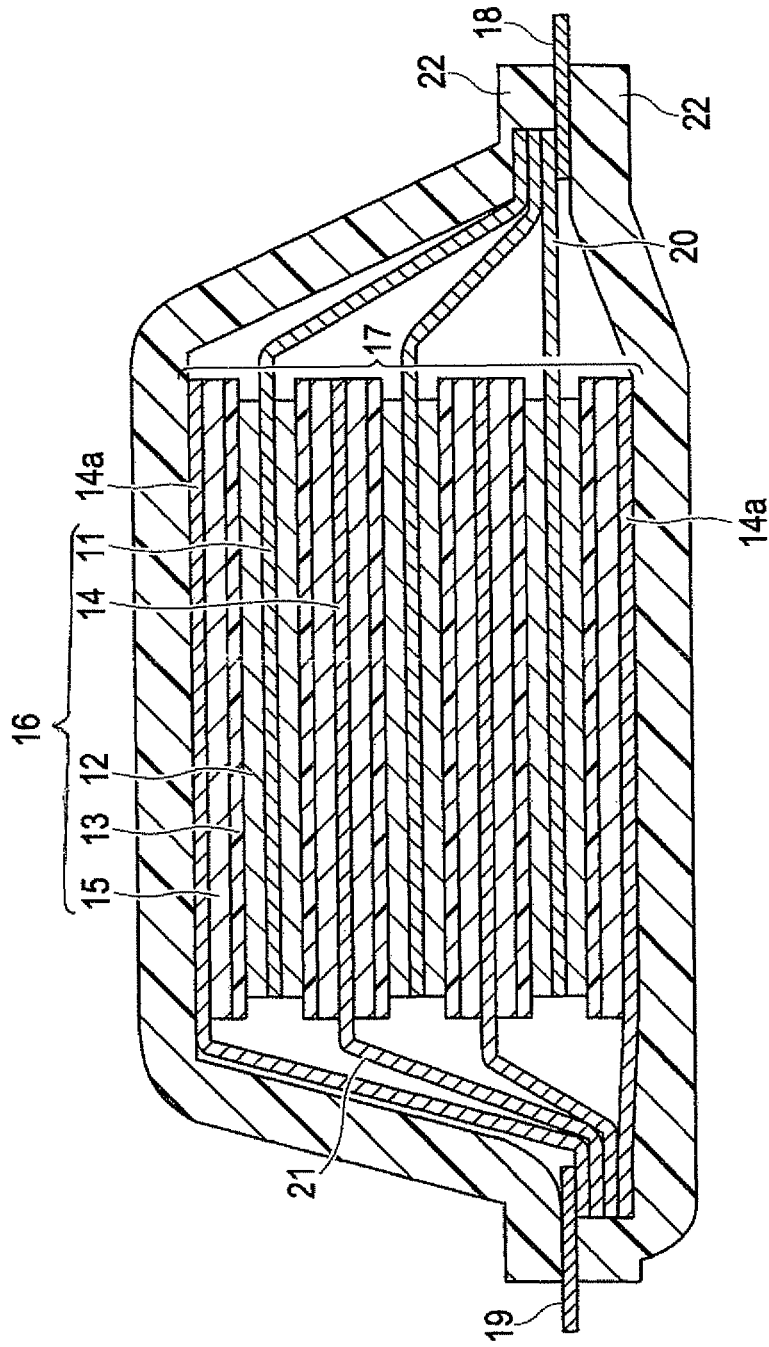
FIG. 1 is a schematic cross-sectional view of an overall structure of a lithium ion cell, which is a representative embodiment of a cell disclosed herein.

A first embodiment is shown in FIG. 1. FIG. 1 is a schematic cross-sectional view showing the overall structure of a laminated non-dipole lithium ion secondary cell (also referred to as "lithium ion cell" hereinafter).

Referring to FIG. 1, in a lithium ion cell 10 of this embodiment, a polymer-metal composite laminate film is used as an outer package 22. The entire peripheral portion of the outer package 22 is fusion-bonded so that a power-generating element 17 is hermetically sealed within the outer package 22.

The power-generating element 17 has a layered structure including a plurality of unit cell layers 16. Each unit cell layer 16 includes a positive electrode, an electrolyte layer 13 and a negative electrode. The positive electrode includes a positive electrode collector 11 with positive electrode active material layers 12 on both surfaces of the positive electrode collector 11. The negative electrode includes a negative electrode collector 14 with negative electrode active material layers 15 on both surfaces of the negative electrode collector 14. The positive electrode, the electrolyte layer 13 and the negative electrode are stacked in that order so that the electrolyte layer 13 lies between the positive electrode active material layer 12 on one surface of the positive electrode and the negative electrode active material layer 15 on one surface of the negative electrode. The number of unit cell layers 16 to be stacked is preferably 5 to 40 and more preferably 10 to 30, for example, but is not particularly limited.

With the above-described structure, the positive electrode collector 11, the adjacent positive electrode active material layer 12, the adjacent electrolyte layer 13, the adjacent negative electrode active material layer 15 and the adjacent negative electrode collector 14 constitute one unit cell layer 16. Thus, the lithium ion cell 10 of this embodiment can also be described as having a structure including a plurality of unit cell layers 16 electrically connected in parallel to each other. Note that negative collectors 14a located at the outermost sides of the power-generating element 17 are each provided with a negative electrode active material layer 15 only on one surface.

A positive electrode tab 18 is affixed to the positive electrode collectors 11 of the electrodes by ultrasonic welding, resistance welding, or the like via respective positive electrode terminal leads 20. A negative electrode tab 19 is similarly affixed to the negative electrode collectors 14 via respective negative electrode terminal leads 21. The positive electrode tab 18 and the negative electrode tab 19 project from the heat-bonded portion of the peripheral portion of the laminate film so as to project out of the outer package 22 (also refer to FIG. 2).

A collector is composed of an electrically conductive material. Active material layers are formed on both surfaces of the collector to form an electrode, which ultimately forms a part of a cell. As disclosed herein, both surfaces of the collector are covered with active material layers of the same polarity (positive or negative). However, in a cell incorporating a power-generating element constituted from a stack of a plurality of unit cell layers, the electrodes located at the outermost sides of the cell do not contribute to the cell reaction. Thus, each of the collectors located at the outermost sides needs only one active electrode layer on the inner-side surface.

The size of the collector is determined based on the expected usage of the cell. For example, if the collector is used in a large-size cell required to exhibit a high energy density, a large collector is used.

The cell disclosed herein is characterized in that the collectors (11 and 14) are formed to have predetermined thicknesses. In particular, the collectors (11 and 14) of both the positive and negative electrodes are relatively thin compared with examples of existing technology. In one embodiment, the negative electrode collector 14 has a significantly small thickness compared with examples of the existing technology. This structure achieves excellent effects described below in the case where a conductor from outside penetrates at least two cells and a short circuit is formed between the two cells via the conductor.

The material for the positive electrode collector 11 and the negative electrode collector 14 is not particularly limited. For example, a metal or a conductive polymer may be employed. Examples of the material include metal materials such as aluminum, nickel, iron, stainless steel, titanium, and copper; a nickel-aluminum clad material; a copper-aluminum clad material; and a plating material containing any combination of these metals. A foil having a metal surface coated with aluminum may also be used. From the standpoints of electron conductivity and action potential of the cell, aluminum and copper are suitable.

In one embodiment, if the melting points (mp) of the metal materials constituting the positive electrode collector 11 and the negative electrode collector 14 are different, then the collector with the lower melting point is referred to as the "first collector," and the collector with the higher melting point is referred to as the "second collector." The thickness of the first collector is made to be larger than that of the second collector. This structure enhances the advantages provided by the invention as described below. According to one preferred embodiment, the first collector is the positive electrode collector 11, and the second collector is the negative electrode collector 14. In other words, the positive electrode collector 11 can be made of the material with the lower melting point (such as aluminum), and the negative electrode collector 14 can be composed of a material (such as copper) having a higher melting point.

The specific thickness of the positive electrode collector 11 and the negative electrode collector 14 is not particularly limited. In some embodiments, the positive electrode collector 11 has a thickness of 1 to 26 μm, and in others, the thickness ranges from 1 to 20 μm. The negative electrode collector 14 has a thickness of 1 to 9 μm, for example. To maximize the advantages provided by the invention, the thickness of the collector is 26 μm or less when the collector is composed of aluminum. In certain embodiments, the thickness is 20 μm or less, 15 μm or less, 10 μm or less, or 6 μm or less. In a preferred embodiment, the thickness is 4 μm or less. An aluminum collector is typically the positive electrode collector 11. In the case where the collector is composed of copper, the thickness is preferably 9 μm or less. In other embodiments, the thickness is 6 μm or less, 4 μm or less, or 3 μm or less. Most preferably, the thickness is 2 μm or less. The copper collector is typically the negative electrode collector 14.

With collectors having thicknesses within the noted ranges, short-circuits can be rapidly resolved before the cell temperature reaches a particular value. The short-circuit phenomenon peculiar to the case where a conductor penetrates at least two cells from the exterior is described below with reference to FIG. 4. The lower limit of the thickness of the collector is not particularly limited. From the standpoint of preventing breakage of the collector during the production of electrodes and thereby increasing the productivity, the lower limit of the thickness when the collector is composed of aluminum is, for example, 6 μm or more. The lower limit of the thickness when the collector is composed of copper is, for example, 4 μm or more.

The positive electrode active material layer 12 and the negative electrode active material layer 15 contain active materials and other appropriate additives as necessary.

The positive electrode active material layer 12 contains a positive electrode active material. Examples of the positive electrode active material include lithium-transition metal complex oxides such as $LiMn_2O_4$, $LiCoO_2$, $LiNiO_2$ and $Li(Ni—Co—Mn)O_2$, the transition metal of which may be partly substituted with another element; lithium-transition metal phosphate compounds; and lithium-transition metal sulfate compounds. Two or more types of positive electrode active materials may be used if necessary. In one preferred embodiment, the positive electrode active material is a lithium-transition metal complex oxide. Naturally, positive electrode active materials other than those described above may also be used.

The negative electrode active material layer 15 contains a negative electrode active material. Examples of the negative electrode active materials include carbon materials such as graphite, soft carbon and hard carbon; lithium-transition metal complex oxides (e.g., $Li_4Ti_5O_{12}$); metal materials; and lithium-metal alloy materials. Two or more types of negative electrode active materials may be used in combination if necessary. In certain preferred embodiments, the negative electrode active material is a carbon material or a lithium-transition metal complex oxide. Naturally, negative electrode active materials other than those described above may also be used.

The average particle diameter of the active materials contained in the positive electrode active material layer 12 and the negative electrode active material layer 15 is not particularly limited but is preferably in the range of 1 to 20 μm and more preferably 1 to 5 μm from the standpoint of high output. Naturally, the average particle diameter may be outside these ranges. Note that in the specification, "particle diameter" refers to a maximum length L among the distances between any two points on the contour of a particle of the active material. "Average particle diameter" refers to an average of diameters of particles observed in a several to several tens of images obtained using a scanning electron microscope (SEM), a transmission electron microscope (TEM) or the like.

Examples of the additives that can be contained in the positive electrode active material layer 12 and the negative electrode active material layer 15 include, for example, a binder, a conductive additive, an electrolyte salt (lithium salt), and an ion-conducting polymer. Examples of the binder include poly(vinylidene fluoride) (PVdF) and synthetic rubber binders.

The conductive additive is an additive blended to enhance the electrical conductivity of the positive electrode active material layer 12 and the negative electrode active material layer 15. Examples of the conductive additive include carbon materials such as carbon black (e.g., acetylene black), graphite, and vapor-deposited carbon fibers. Incorporation of a conductive additive in the positive electrode active material layer 12 or the negative electrode active material layer 15 effectively forms electronic networks inside the active material layer and improves the output performance of the cell.

Examples of the electrolyte salt (lithium salt) include $Li(C_2F_5SO_2)_2N$), $LiPF_6$, $LiBF_4$, $LiClO_4$, $LiAsF_6$, and $LiCF_3SO_3$.

Examples of the ion-conducting polymers include polyethylene oxide (PEO)-based polymers and polypropylene oxide (PPO)-based polymers.

The blend ratio of the components contained in the positive electrode active material layer 12 and the negative electrode active material layer 15 is not particularly limited. The blend ratio can be adjusted by adequately referring to publicly-known literature regarding non-aqueous solvent secondary cells.

The thickness of the positive electrode active material layer 12 and the negative electrode active material layer 15 is also not particularly limited and knowledge common in the field can be adequately applied. For example, the thickness of the positive electrode active material layer 12 and the negative electrode active material layer 15 is in the range of about 2 to 100 μm.

The electrolyte constituting the electrolyte layer 13 can be a liquid electrolyte or a polymeric electrolyte. A liquid electrolyte contains an organic solvent, i.e., a plasticizer, and a lithium salt, i.e., a supporting electrolyte, dissolved in the organic solvent. Examples of the organic solvent usable as the plasticizer include carbonates such as ethylene carbonate (EC) and propylene carbonate (PC). Examples of the supporting electrolyte (lithium salt) include compounds, such as LiBETI, that can be added to active material layers of electrodes.

Polymeric electrolytes can be classified into gel electrolytes containing electrolytic solutions and intrinsic polymer electrolytes containing no electrolytic solutions.

The gel electrolyte contains a matrix polymer composed of an ion-conductive polymer and a liquid electrolyte injected in the matrix polymer. Examples of the ion-conducting polymer usable as the matrix polymer include polyethylene oxide (PEO) and polypropylene oxide (PPO), and copolymers thereof. An electrolyte salt such as lithium salt dissolves well in such a polyalkylene oxide-based polymer.

In the case where the electrolyte layer is composed of a liquid electrolyte or a gel electrolyte, a separator may be used in the electrolyte layer. Examples of the specific form of the separator include polyolefin microporous films composed of polyethylene, polypropylene and the like.

The intrinsic polymer electrolyte contains a matrix polymer and a supporting electrolyte (lithium salt) dissolved in the matrix polymer and is free of an organic solvent, i.e., a plasticizer. Thus, in the case where the electrolyte layer is composed of an intrinsic polymer electrolyte, there is no risk of leakage of liquid from the cell and the reliability of the cell can be improved.

The matrix polymer of the gel electrolyte and the intrinsic polymer electrolyte can exhibit superior mechanical strength if a cross-linking structure is formed. For example, a cross-linking structure may be formed by polymerizing a polymerizable polymer (e.g., PEO or PPO) for forming polymeric electrolytes in the presence of an adequate initiator. Examples of the process of the polymerization include thermal polymerization, ultraviolet polymerization, irradiation polymerization and electron beam polymerization.

In order to extract electrical current from the cell, tabs electrically connected to the collectors, here the positive electrode tab 18 and the negative electrode tab 19, extend from the cell outer package. In particular, as shown in FIG. 1, the positive electrode tab 18 electrically connected to the positive electrode collector 11 and the negative electrode tab 19 electrically connected to the negative electrode collector 14 extend from the laminate sheet, i.e., the outer package 22.

The material constituting the tabs 18, 19 is not particularly limited, and known highly conductive material usually used as the tabs for lithium ion cells can be used. Metal material such as aluminum, copper, titanium, nickel and stainless steel (SUS), or alloys thereof, are suitable for the tabs. For lighter weight, corrosion resistance and high conductivity, aluminum and copper are more preferable. The positive electrode tab 18 and the negative electrode tab 19 may be composed of the same or different materials. The positive electrode collector 11 and the negative electrode collector 14 may extend so that the extensions function as the positive electrode tab 18 and the negative electrode tab 19. Alternatively, the positive electrode tab 18 and the negative electrode tab 19 may be separately prepared and attached to the collectors.

The positive electrode terminal lead 20 and the negative electrode terminal lead 21 are used if necessary. For example, if the positive electrode tab 18 and the negative electrode tab 19 are formed directly from the positive electrode collector 11 and the negative electrode collector 14 by extensions, the positive electrode terminal lead 20 and the negative electrode terminal lead 21 need not be provided.

The positive electrode terminal lead 20 and the negative electrode terminal lead 21 may be terminal leads typically used in existing lithium ion cells. The parts extending from the outer package 22 can be coated with heat-resistant, insulating heat-shrinkable tubes or the like so as not to adversely affect the products (e.g., automobile components, in particular, electronic devices, etc.) when the parts come into contact with the peripheral devices.

An existing metal can case can be used as the outer package 22. A pouched casing composed of an aluminum-containing laminate film capable of accommodating the cell may also be used as the outer package 22. Examples of the laminate film include, but are not limited to, a three-layer laminate film having a PP/aluminum/nylon structure. In this invention, a laminate film that can increase the output, has excellent ability to cool, and is suitable for cells for large-size apparatuses such as EVs and HEVs is preferable.

Figure 2:
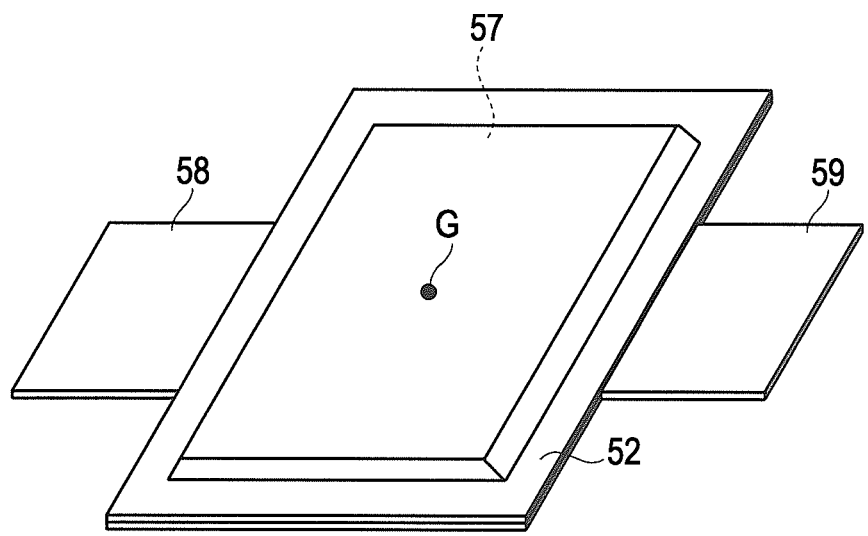
FIG. 2 is a plan view of the lithium ion cell of a representative embodiment of the cell disclosed herein.

As shown in FIG. 2, a flat, laminated lithium ion secondary cell 50 according to one embodiment taught herein has a flat, oblong shape. A positive electrode tab 58 and a negative electrode tab 59 extend from two sides to output electrical power. A power-generating element 57 is packaged in a cell outer package 52 of the lithium ion secondary cell 50. The peripheral portion of the package is heat-sealed, and the power-generating element 57 is hermetically sealed with the positive electrode tab 58 and the negative electrode tab 59 extracted. The power-generating element 57 corresponds to the power-generating element 17 of the lithium ion cell 10 shown in FIG. 1 and includes a stack of a plurality of unit cell layers 16 described above.

The shape of the cell disclosed herein is not limited to the laminated and flat shape shown in FIGS. 1 and 2. In a rolled lithium ion cell, the shape may be cylindrical or rectangular. Alternatively, a cell having a cylindrical shape may be deformed into a flat oblong shape. When the cell has a cylindrical or rectangular shape, the outer package is not particularly limited and a laminate film or a known cylindrical can (metal can) may be used.

The manner of extracting the tabs 58 and 59 may be any and is not limited to one shown in FIG. 2. For example, the positive electrode tab 58 and the negative electrode tab 59 may be extracted from the same side. Alternatively, two or more positive electrode tabs 58 and negative electrode tabs 59 may be provided so that the tabs extend from all sides. In a rolled lithium ion cell, a cylindrical can (metal can) can be used instead of tabs to form terminals.

Figure 3C:
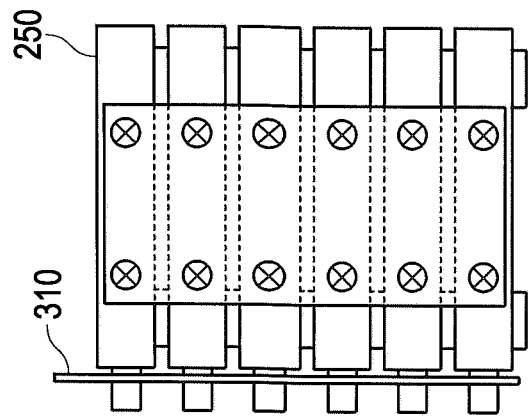
FIGS. 3A to 3C are schematic external views of a representative embodiment of a battery constituted from the cells of a first embodiment and are respectively a plan view, a front view, and a side view of the battery.
Figure 3A:
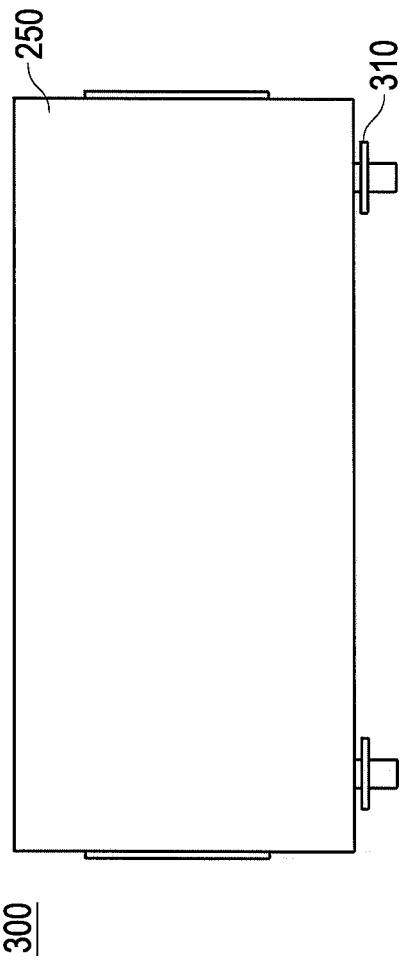
Figure 3B:
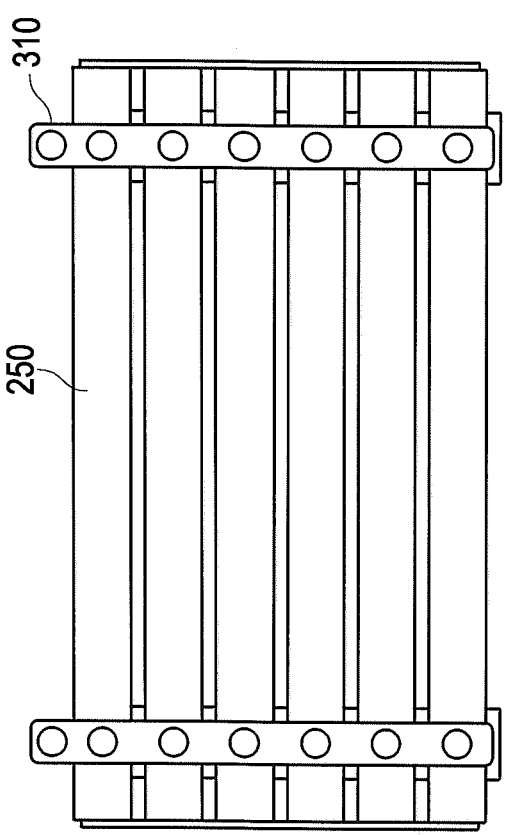

Two or more cells as taught herein may be electrically connected to form a battery such as that shown in FIGS. 3A to 3C.

As shown in FIGS. 3A to 3C, a battery 300 includes a plurality of detachably attached battery units 250 connected in series and parallel to each other, each battery unit 250 including a plurality of lithium ion cells of the first embodiment connected in series and parallel. With this structure, a battery 300 suitable for vehicle driving power supplies and auxiliary power supplies that require high volume energy density and high volume output density can be formed.

The detachably attached battery units 250 are connected to each other through an electrical connecting member such as a bus bar and stacked using connecting fixtures 310. In fabricating the battery 300, the number of the battery units 250 to be connected and stacked may be determined on the basis of the battery capacity required and the type of vehicle (electrical vehicles and the like) on which the battery 300 is to be mounted.

The inventors have ardently conducted studies in developing battery technology for use with vehicles such as EVs and HEVs. In the course of the study, the inventors have found that in the case where short circuit occurs between two or more cells, the short circuit current sometimes continues flowing. This is described in detail below.

Figure 4:
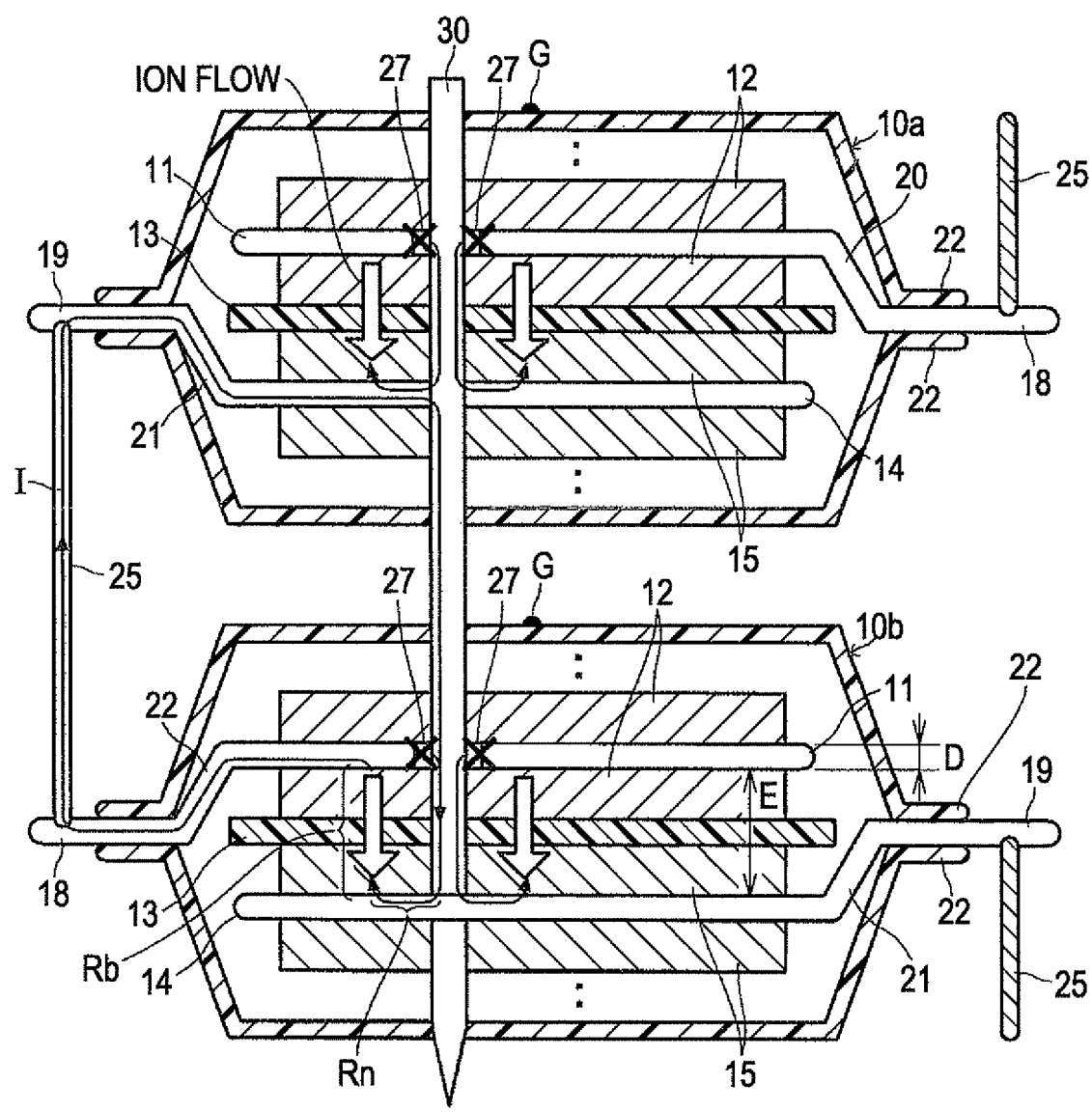
FIG. 4 is a schematic cross-sectional view showing an example of a mechanism of a short circuit between cells constituting the battery, the example being a case where a conductor from outside penetrates two cells connected in series and a short circuit is formed between the two cells through this conductor.

FIG. 4 is a schematic cross-sectional view showing the testing condition where a short occurs between two cells connected to each other. This is an example of a case where a conductor from outside penetrates two cells connected in series, and a short circuit is formed between the two cells through this conductor.

As shown in FIG. 4, a conductive member 30 penetrates a battery unit 40 including two lithium ion cells 10a and 10b electrically connected in series.

Here, the occurrence of a short in individual cells independent from the other is contemplated. According to common understanding in the art, it has been believed that the short circuit created by the conductive member 30 will stop once the shorted portion of at least one of the positive and negative electrode collectors 11, 14 is burned out by exothermic fusion, and atoms constituting the portion diffuse. In FIG. 4, the case where the positive electrode collectors 11 are burned out is illustrated. However, even when the shorted portion of the positive electrode collector 11 (or the negative electrode collector 14) is burned out by fusion, a short may occur between the cells 10a and 10b connected in series in the battery unit 40 and the electric current may keep flowing. The present inventors have discovered this phenomenon and have succeeded in providing ways to block the flow of the current in the event of shorting between cells connected in series.

In the case where the conductive member 30 penetrates the two cells 10a and 10b so as to connect these cells to each other, even in the related art, non-conducting portions 27 indicated by cross symbols in the shorted parts can be formed by fusing the positive electrode collector 11 in contact with the conductive member 30. In this manner, the short circuit (current flow) that occurs inside the individual cell can be blocked.

In contrast, under the condition in which two cells are electrically connected to each other in series, as in the battery unit 40 in FIG. 4, an unanticipated short circuit is formed between the unfused negative electrode collectors 14 of the cells 10a and 10b through connecting terminal 25 between the cells 10a and 10b. As a result, the short-circuit current I keeps flowing through connecting terminal 25 and the conductive member 30. Arrows indicate the flow of the short circuit current I and ions in FIG. 4. Consequently, the battery performance may be degraded due to continuation of the shorting. In embodiments of the invention disclosed herein, the collectors are designed to be relatively thin as discussed above. This allows the shorted portions of both the positive and negative electrode collectors 11, 14 in contact with the conductive member 30 to undergo fusion by heat generated by the short circuit current, eventually burning out. Accordingly, the flow of short circuit current via the conductive member 30 can be blocked. Not being bound by any particular theory, it is contemplated that a decrease in thickness of the collector decreases the calorific capacity of the collector and accelerates an increase in temperature of the collector when the calorie derived from short circuit current is constant, thereby promoting the fusion of the collector and blocking the newly-discovered short circuit.

It should be noted that batteries are typically designed with a particular capacity margin relative to the nominal operating capacity. Although the area of the shorted portions that were burned out by fusion do not further contribute to power generation as a result of the fusion, the lost power generation is relatively small with respect to the total reaction area of the battery as a whole. Thus, the loss can be compensated by the margin, and the battery can be charged and discharged during further operation without any problem.

Although specific embodiments that achieve these advantages are described above, the invention is not limited to these embodiments and various modifications and alterations are possible. In modifications, for example, the thickness of the collector may be varied and yet achieve the advantages above. The same advantages can be achieved by decreasing the thickness of the collector composed of aluminum or copper as described above. In using other materials to form the collector, the following guidelines may be observed in determining the upper limit thickness of the collector that can achieve the advantages of the invention.

Whether the collector burns out by fusion from the shorting and thereby blocks the short circuit depends upon the magnitude of the relationship between the amount of heat Q (calorific value) generated at the shorted portions due to the current flow and the amount of heat of fusion C required to fuse the collector. In other words, when Q is larger than C (Q>C), the shorted portions of the collectors burn out by fusion.

The calorific value Q in joules (J) is in proportion to the electrical resistance Rn in Ohms ($\Omega$) of the shorted portions and the square of the short circuit current value I in Amperes (A). Rn is in proportion to the resistivity ($\Omega \cdot cm$) of the constituent material of the collector and is in inverse proportion to the volume of the collector.

The amount of heat of fusion C (J) of the collector is in proportion to the density ($g/cm^3$) of the collector, the specific heat Cp ($J/g \cdot °C$) of the collector, the fusion temperature Tm (°C) of the collector and the volume of the collector.

In view of the above, in the case where the constituent material of the collector is unchanged, Q can be increased and C can be decreased to achieve Q>C by decreasing the thickness of the collector and thereby decreasing the volume of the collector.

As the specific battery configurations change, i.e., the thickness of the electrode active material layer and the number of the unit cells stacked, the thickness of the collector that can achieve the advantages disclosed herein changes. For example, when the thickness of the electrode active material layer or the number of cells stacked is increased, the battery capacity and the electrode resistance Rb ($\Omega$) also increase. Since the short circuit current value I flowing in the event of shorting is the voltage of the battery E in volts (V) divided by Rb, I relatively decreases with increasing Rb. Since Q also decreases with I, it becomes necessary to further decrease C in order to achieve Q>C in such a case. For example, the thickness of the collector may be further reduced to satisfy Q>C.

As described above, the specific values of Q and C vary according to various conditions such as constituent material of the collector. However, the thickness of the collector can be adequately adjusted to achieve the desired advantages by following the above-described guideline. If the specific values of Q and C can be theoretically calculated, suitable ratios of Q and C can be Q/C>1.2 or Q/C>1.5, for example.

In the embodiments herein, both positive electrode collector 11 and negative electrode collector 14 satisfy the relationship Q>C. Thus, continuation of the short-circuit current flow between cells in the battery, i.e., the phenomenon peculiar to the cells used as a battery and not anticipated in the related art, can be overcome.

According to the battery embodiment shown in FIG. 4, the shorted portions fuse and the short circuit is blocked before the temperature of the cells reaches a particular value due to the current flowing in the short circuit. Here, "particular value" refers to a temperature at which the cell may undergo breakdown. This particular value differs according to the specific battery and cell configurations, such as electrode active material, electrolytic solution and separators, and cannot be exclusively defined. The value may be adequately adjusted according to the specific details. For example, the value may be set to be in the range of 60° C. to 70° C. The value can be increased by forming a cell with a material having a relatively high heat resistance. The value can be decreased by forming a cell with a material having a relatively low heat resistance.

The cells of the embodiment can be installed in vehicles by utilizing them in the form of the battery described above. The battery installed in a vehicle may be used as a power source for driving a motor of the vehicle, for example.

Figure 5:
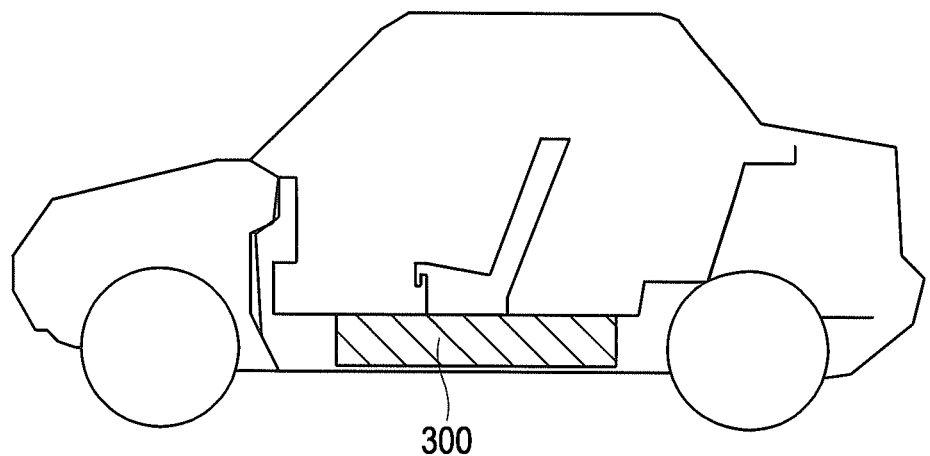
FIG. 5 is a perspective view of a vehicle equipped with a battery shown in FIG. 3.

FIG. 5 is a conceptual diagram showing a vehicle with the battery shown in FIGS. 3A to 3C. As shown in FIG. 5, the battery 300 can be installed below the seats of an electric vehicle 400 at the central part of the vehicle body. By installing the battery 300 under the seats, a wide interior space and more trunk room can be realized. The place to install the battery 300 is not limited to below the seats and may be below the rear trunk room or in an engine room at the front part of the vehicle. The electric vehicle 400 with the battery 300 has high durability and provides sufficiently high output in long-time use. Moreover, a hybrid vehicle that excels in fuel consumption and driving performance can be provided.

The method for making the cell embodiment disclosed herein is not particularly limited. Any existing method can be used to make the cell.

When the electrolyte is a liquid electrolyte, the cell can be produced as follows. An electrode slurry containing electrode materials such as an active material and a conductive additive is applied (coated) on both surfaces of the collector foil to form a positive electrode and a negative electrode. The electrodes were cut so that the negative electrode is larger than the positive electrode. The electrodes were then dried for 1 day in a vacuum drier at 90° C. The positive electrodes and the negative electrodes are alternately stacked while interposing porous films of an appropriate thickness (e.g., about 25 µm) composed of polypropylene or the like between the positive electrodes and the negative electrodes so that the negative electrodes come at the outermost sides. The positive electrodes and the negative electrodes are bound, and leads are welded thereto. The resulting stack is placed in an aluminum laminate film bag while exposing the leads of the positive and negative electrodes, an electrolytic solution is injected with a dispenser, and the edges are sealed under a reduced pressure to form a cell.

Production of cells, such as gel electrolyte cells and all solid polymer cells, other than cells using the electrolytic solution as the electrolyte can be done by referring to the technology known heretofore. Thus, the description thereof is omitted here.

A second embodiment is the same as the first embodiment except that the negative electrode collector has a layered structure. In particular, the negative electrode collector has a structure in which conductive layers and a reinforcing layer are stacked. "Reinforcing layer" is a layer for enhancing the stiffness of the collector.

Figure 6:
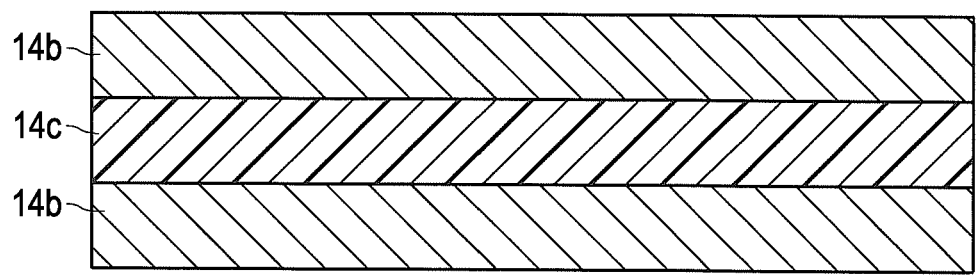
FIG. 6 is a cross-sectional view taken along a direction perpendicular to the plane direction of the negative electrode collector in a lithium ion cell of a second embodiment.

FIG. 6 is a cross-sectional view taken in a direction perpendicular to the plane direction of the negative electrode collector in a lithium ion cell of this embodiment. As shown in FIG. 6, the negative electrode collector 14 of this embodiment has a structure including a reinforcing layer 14c and two metal layers 14b respectively disposed on two opposing surfaces of the reinforcing layer 14c.

As with typical cell collectors, the negative electrode collector 14 of this embodiment is provided with an active material layer on one or both surfaces to form an electrode (negative electrode) and eventually constitutes part of a cell. Note that although a structure in which the metal layers 14b are formed on both surfaces of the reinforcing layer 14c is illustrated in FIG. 6, a negative electrode collector 14 in which a metal layer is provided on only one of the surfaces of the reinforcing layer can be used depending on the case. The metal layers may be conductive layers composed of conductive materials (e.g., conductive polymers) other than metals.

Such a structure of this embodiment achieves the desired advantages described in the first embodiment and additional advantages, i.e., suppression of rupture in metal layers during cell production (in particular, during application of electrode slurry onto the collector) and increasing the yield of the cell production. Furthermore, since the reinforcing layer absorbs vibrations inside the cell when the cell is shaken (mounted on a vehicle), vibration resistance is enhanced. In this embodiment, "shorted portions of the negative electrode collector 14" refer to shorted portions in the metal layers 14b of the negative electrode collector 14.

In this embodiment, the metal constituting the metal layers 14b and the materials constituting the reinforcing layer 14c of the layered negative electrode collector 14 may be any suitable metals or materials. For example, a metal used as a cell collector material in the related art and insulators known in the art may be used. The materials listed as the examples of the material constituting the collectors in the first embodiment above can be used as the metal constituting the metal layers 14b.

The material constituting the reinforcing layer 14c is, for example, an insulating material such as a resin, a ceramic or a resin/ceramic composite material. The reinforcing layer 14c is suitably composed of a resin from the standpoint of weight reduction of the reinforcing layer and may be any suitable resin. Examples thereof include polyimide (PI), polyethylene terephthalate (PET), polyacrylonitrile (PAN), polypropylene (PP), and polyethylene (PE). Among these, polyimide and polyethylene terephthalate are particularly preferable from the standpoint of heat resistance. A specific example of the polyimide is Kapton (trade name).

In this embodiment, the thicknesses of the metal layers 14b and the reinforcing layer 14c of the negative electrode collector 14 are not particularly limited. However, in order to block a short circuit formed by penetration into at least two cells by a conductor from outside, the thickness of the reinforcing layer 14c is preferably controlled. In order to block the short circuit, it is necessary to fuse the positive electrode collector 11 and the metal layers 14b of the negative electrode collector 14 by the heat generated by the current flowing in the short circuit. In such a case, it can be anticipated that if the reinforcing layer 14c is excessively thick, the heat generated by the short circuit current is absorbed due to the increase in heat capacity of the reinforcing layer 14c, and heat sufficient for fusion of the metal layers 14b cannot be obtained. Thus, it is contemplated that the desired advantages can be achieved by controlling the thickness of the reinforcing layer 14c such that the reinforcing layer 14c does not excessively absorb the heat necessary for fusing the metal layers 14b of the negative electrode collector 14 during shorting.

Specific values of the thicknesses of the metal layers 14b and the reinforcing layer 14c of the negative electrode collector 14 in this embodiment may be any that can achieve the above-described advantages. The thicknesses may be adjusted as needed. For example, the thickness of the metal layer 14b (total thickness of the metal layers 14b if both surfaces of the reinforcing layer 14c are covered with the metal layers 14b) is preferably within the range described in the section of the first embodiment related to the collectors. The thickness of the reinforcing layer 14c is, for example, about 4 to 20 µm. Although not so limited, in this embodiment the total thickness of the negative electrode collector 14 is preferably 6 to 12 µm, and more preferably 8 to 10 µm. In an embodiment where the metal layers 14b are composed of copper, the thickness of the metal layers 14b can be 0.1 to 6 µm and more preferably is 0.1 to 2 µm.

Although the invention is described above by taking an example in which the negative electrode collector 14 has a layered structure, it may be the positive electrode collector 11 that has a similar layered structure. In such an embodiment, the thicknesses of the metal layers and the reinforcing layer of the positive electrode collector 11 are also particularly not limited. However, in order to achieve the desired advantages of blocking a short circuit formed by penetration of at least two cells by a conductor from outside, the thicknesses of the metal layers and the reinforcing layer can be controlled as described above.

The specific values of the thicknesses of the metal layers and the reinforcing layer of the layered positive electrode collector 11 are also not particularly limited as long as the above-described advantages are achieved, and the thicknesses may be adequately adjusted. For example, the thickness of the metal layer (total thickness of the metal layers if both surfaces of the reinforcing layer are covered with the metal layers) is preferably within the range described for the collector of the first embodiment. The thickness of the reinforcing layer may be about 8 to 19 μm. In such a case, the total thickness of the positive electrode collector 11 can be 5 to 20 μm, or more preferably 5 to 10 μm. In an example where metal layers are composed of aluminum, the thickness of the metal layer is preferably, but not necessarily, 1.4 to 12 μm. In certain preferred embodiments, the thickness of the metal layer is preferably 1.4 to 8 μm.

The various thicknesses described above can be measured with existing technology (e.g., SEM analysis of cross-sections).

As described above, in the second embodiment in which the collector includes a reinforcing layer, the thickness of the reinforcing layer must be taken into account in determining the thickness of the collector (i.e., the thickness of the metal layers of the collector) according to the guidelines described in the first embodiment. That is, in order to block the short circuit, the metal layers 14b must be fused. If the thickness of the reinforcing layer 14c is undesirably thick in such a case, it can be assumed that the metal layers 14b will not fuse. Without being bound to theory, this is presumably because the heat generated by the short circuit current is absorbed as the heat capacity of the reinforcing layer 14c increases, and heat necessary for fusing the metal layers 14b cannot be obtained as a result. Thus, in designing the collector of the second embodiment, the thickness of the reinforcing layer 14c are controlled to a thickness so as not to excessively absorb the heat necessary for the shorted portions of the negative electrode collector 14 (i.e., the metal layers 14b of the negative electrode collector 14) to fuse during shorting. In this manner, the advantages of the invention can be achieved.

The advantages of the invention disclosed herein are now described by way of Examples and Comparative Examples below. Note that the technical scope of the invention is not limited to those examples described below.

In Examples and Comparative Examples below, batteries were formed using non-aqueous electrolyte cells with collectors of various thicknesses, and the increase in temperature during shorting was monitored.

In particular, the batteries of Comparative Example 1 and Examples 1 to 5 were prepared as below.

In preparing the negative electrode, copper foils having thicknesses described in Table 1 were prepared as negative electrode collectors. A negative electrode active material slurry was prepared by dispersing hard carbon (90 parts by mass), i.e., a negative electrode active material, and PVdF (10 parts by mass), i.e., a binder, in an adequate amount of N-methyl-2-pyrrolidone (NMP), i.e., a slurry viscosity-adjusting solvent. The resulting negative electrode active material slurry was applied on both surfaces of each of the negative electrode collectors prepared as above by using a coating machine, dried, and pressed with a roll pressing machine to form negative electrode active material layers (thickness: 75 μm each side). The resulting collector with the electrode active material layers was cut to a size of 10 cm×5 cm, and a nickel negative electrode lead was welded on the negative electrode collector to thereby form a negative electrode.

In the preparation of the positive electrode, aluminum foils having thicknesses described in Table 1 were prepared as positive electrode collectors. A positive electrode active material slurry was prepared by dispersing $LiMn_2O_4$ (85 parts by mass), i.e., a positive electrode active material, acetylene black (5 parts by weight), i.e., a conductive additive, and a PVdF (10 parts by mass), i.e., a binder, in an adequate amount of NMP, i.e., a slurry viscosity-controlling solvent. The resulting positive electrode active material slurry was applied on both surfaces of each of the positive electrode collectors prepared as above by using a coating machine, dried, and pressed with a roll pressing machine to form positive electrode active material layers (thickness: 110 μm each side). The resulting collector with the electrode active material layers was cut to a size of 9.5 cm×4.5 cm, and an aluminum positive electrode lead was welded on the positive electrode collector to thereby form a positive electrode.

In the preparation of the cells and batteries, a polyethylene microporous film (thickness: 30 μm, size: 10.5 cm×5.5 cm) was prepared as a separator. As an electrolytic solution, a 1 M solution of a lithium salt, $LiPF_6$, in an ethylene carbonate (EC)/diethyl carbonate (DMC) equivolume mixture was prepared.

Eleven positive electrodes, ten negative electrodes and eleven separators prepared as above were sequentially stacked to form a layered structure (power-generating element) so that the separator was between the positive electrode active material layer of the positive electrode and the negative electrode active material layer of the adjacent negative electrode, as shown in FIG. 1.

The positive electrode lead and the negative electrode lead were respectively welded on the positive electrode tab and the negative electrode tab, and the resulting layered structure (power-generating element) was placed in an external package made of an aluminum laminate sheet so that the positive electrode tab and the negative electrode tab are exposed from the package. The electrolytic solution prepared as above was injected and the bag was sealed to form a layered lithium ion cell as shown in FIG. 2.

Three layered lithium ion cells were connected in series using cell-connecting bus bars as shown in FIGS. 3A to 3C to make a battery, and the battery was used for the short-circuit test described below.

The test for monitoring the increase in temperature during discharge in the short-circuit test is now described.

Each of the batteries of Examples 1 to 5 and Comparative Example 1 was assembled and initially charged at 0.5 Coulombs (C) to a full charge state (battery terminal voltage: 4.2 V). After the battery in a full charge state was aged for 1 week, the battery was initially discharged at 1 C until 2.0 V (battery terminal voltage), and the capacity was measured. The battery or cells were then charged to a full charge state at 0.5 C, and, as shown in FIG. 4, a conductor member having a diameter of 3 mm was inserted to penetrate the whole battery to conduct the short-circuit test. Discharge at 100 C was conducted until 2.0 V (battery terminal voltage), and the cell surface temperature during discharge was measured. The cell surface temperature was measured by attaching a thermocouple on a central portion (the portion indicated by G in FIG. 2) of a laminate external package of the cell, and the maximum increase in temperature of the cell was determined. As for each cell, a thermocouple was attached on each of the three cells, and the average of the maximum increases in cell temperature of cells was used as the cell surface temperature. Experimental results are shown in Table 1.

As shown in Table 1, in the batteries of Examples 1 to 5, the increase in temperature was 75° C. or less. It is presumed from this result that the short circuit was blocked within 500 msecs. from its onset. Moreover, the cells were reusable. In contrast, in the battery of Comparative Example 1, the short-circuit current was not blocked, and a temperature increase of 120° C. was observed. The battery was not reusable.

Table 1 also includes two Reference Examples. Reference Example 1 was a single cell identical to one of the cells used in the battery of Comparative Example 1. Reference Example 2 was the same single cell as Reference Example 1 except that the thickness of the aluminum foil serving as the positive electrode collector was changed to 20 μm. As shown in Table 1, the increase in temperature of the cells of Reference Examples 1 and 2 was only about 60° C. to 65° C., and the cells could be reused. The experiments on the Reference Examples were conducted to show that the short circuit can be blocked if the cell of Comparative Example 1 is used alone rather than stacked as a battery.

To confirm the burn-out, or rupture, of the collector, batteries of Examples 1 to 5 and Comparative Example 1 and the cells of Reference Examples 1 and 2 were discharged at 100 C. Then whether or not the batteries could be charged or discharged further was investigated. Subsequently, the batteries and the cells were disassembled to confirm whether there was burn-out (rupture) in the collector foil.

In the batteries of Examples 1 to 5, burn-out was confirmed in the peripheries of the shorted portions of all collectors, and non-conducting portions were formed thereby. In contrast, in the battery of Comparative Example 1 and the cells of Reference Examples 1 and 2, the peripheries of the shorted portions of the aluminum foils were burned out to block the flow of the current, but the peripheral portions of the copper foils remained unburned.

Without being bound by a single theory, the reason that the increase in cell temperature differed between Reference Example 1 and Comparative Example 1, with identical cell configuration, is presumably as follows. When cells are formed into a battery as in Comparative Example 1, a new conduction path is formed along the copper foils and shorted portions of the individual cells and along the inter-cell terminal, so that current continues to flow in the battery. As a result, the temperature of the cells is elevated by 120° C. In contrast, in cells of Reference Examples 1 and 2 in which the burn out (rupture) of aluminum foil was observed, no new conduction path is formed as there is no inter-cell terminal. Thus, the flow of current to the shorted portions of the collector foil can be blocked by burn-out of the aluminum foil only, and the temperature increase of the cell can be suppressed to 60° C. to 65° C.

The description above shows that the cells of the present invention can block the short circuit between cells constituting a battery, which has not been possible with existing cells in which short circuit can be blocked only in one cell.

Additional examples are next described.

In the preparation of the negative electrode for Example 6, a negative electrode collector including Cu (thickness: 3 μm)/PI (thickness: 4 μm)/Cu (thickness: 3 μm) stacked in that order was prepared. A negative electrode active material slurry was prepared by dispersing hard carbon (90 parts by mass), i.e., a negative electrode active material, and poly(vinylidene fluoride) (PVdF) (10 parts by mass), i.e., a binder, in an adequate amount of N-methyl-2-pyrrolidone (NMP), i.e., a slurry viscosity-adjusting solvent. The resulting negative electrode active material slurry was applied on both surfaces of the negative electrode collector prepared as above by using a coating machine and then was dried. The resulting layered electrode was pressed with a roll press machine to form negative electrode active material layers (thickness: 75 μm) and cut to a size of 10 cm×5 cm. A negative electrode lead composed of nickel was welded onto the negative electrode collector to form a negative electrode plate.

In the preparation of the positive electrode for Example 6, an aluminum foil (thickness: 20 μm) was prepared as a positive electrode collector. A positive electrode active material slurry was prepared by dispersing $LiMn_2O_4$ (85 parts by mass), i.e., a positive electrode active material, acetylene black (5 parts by mass), i.e., a conductive additive, and poly(vinylidene fluoride) (PVdF) (10 parts by mass), i.e., a binder, in an adequate amount of N-methyl-2-pyrrolidone, i.e., a slurry viscosity-adjusting solvent. The resulting positive electrode active material slurry was applied on both surfaces of the positive electrode collector prepared as above by using a coating machine and then was dried. The resulting layered electrode was pressed with a roll press machine to form positive electrode active material layers (thickness: 110 μm) and cut to a size of 9.5 cm×4.5 cm. An aluminum positive electrode lead was welded onto the positive electrode collector to prepare a positive electrode.

To prepare the battery of Example 6, a polyethylene microporous film (PE separator) (thickness: 30 μm, size: 10.5 cm×5.5 cm) was prepared as a separator. A 1 M solution of a lithium salt, $LiPF_6$, in an equivolume mixture of ethylene carbonate (EC) and dimethyl carbonate (DMC) was prepared as an electrolytic solution. Ten layered electrode (eleven positive electrodes and ten negative electrodes) prepared as above and eleven separators are sequentially stacked so that the

TABLE 1

|  | Test conditions | Thickness of negative electrode collector (μm) | Thickness of positive electrode collector (μm) | Increase in temperature (° C.) | Rupture of collector |
|---|---|---|---|---|---|
| Example 1 | 3-cells in series | 2 | 15 | 60 | Occurred in positive and negative electrodes |
| Example 2 |  | 4 | 15 | 63 | Occurred in positive and negative electrodes |
| Example 3 |  | 6 | 15 | 65 | Occurred in positive and negative electrodes |
| Example 4 |  | 8 | 15 | 70 | Occurred in positive and negative electrodes |
| Example 5 |  | 9 | 15 | 75 | Occurred in positive and negative electrodes |
| Comparative Example 1 |  | 10 | 15 | 120 | Occurred in positive electrode only |
| Reference Example 1 | One cell | 10 | 15 | 60 | Occurred in positive electrode only |
| Reference Example 2 |  | 10 | 20 | 65 | Occurred in positive electrode only | positive electrode active material layer of the positive electrode faces the negative electrode active material layer of the adjacent negative electrode.

The active material layer was not formed on the outer surface of the layered electrodes located at the outermost sides. An aluminum positive electrode lead was welded on the collector (Al surface) of the layered electrode located at the positive electrode-side outermost layer. A nickel negative electrode lead was welded onto the collector (Cu surface) of the layered electrode located at the negative electrode-side outermost layer.

The resulting layered structure (power-generating element) was packed in an outer package made of an aluminum laminate sheet while extracting the positive electrode lead and the negative electrode lead, and the electrolytic solution was injected into the package. The package was sealed to form a layered cell.

Two layered cells obtained as above were connected in series using cell-connecting bus bars as shown in FIGS. 3A to 3C to form a battery.

In preparing Example 7, cells and a battery having the same electrode configuration and the same number of layers were prepared as in Example 6 except that a Cu/PI/Cu foil (thickness: 2.5 μm/5 μm/2.5 μm) was used as a negative electrode collector.

In preparing Example 8, cells and a battery having the same electrode configuration and the same number of layers were prepared as in Example 6 except that a Cu/PI/Cu foil (thickness: 1 μm/8 μm/1 μm) was used as a negative electrode collector.

In preparing Example 9, cells and a battery having the same electrode configuration and the same number of layers were prepared as in Example 6 except that a Cu/PI/Cu foil (thickness: 0.5 μm/9 μm/0.5 μm) was used as a negative electrode collector.

In preparing Example 10, cells and a battery having the same electrode configuration and the same number of layers were prepared as in Example 6 except that a Cu/PI/Cu foil (thickness: 0.3 μm/9.4 μm/0.3 μm) was used as a negative electrode collector.

In preparing Example 11, cells and a battery having the same electrode configuration and the same number of layers were prepared as in Example 6 except that a Cu/PI/Cu foil (thickness: 0.1 μm/9.8 μm/0.1 μm) was used as a negative electrode collector.

In preparing Example 12, cells and a battery having the same electrode configuration and the same number of layers were prepared as in Example 6 except that a Cu/PI/Cu foil (thickness: 0.05 μm/9.9 μm/0.05 μm) was used as a negative electrode collector.

In preparing Example 13, cells and a battery having the same electrode configuration and the same number of layers were prepared as in Example 6 except that a Cu/PET/Cu foil (thickness: 1 μm/8 μm/1 μm) was used as a negative electrode collector.

In preparing Comparative Example 2, cells and a battery having the same electrode configuration and the same number of layers were prepared as in Example 6 except that a Cu foil (thickness: 10 μm) was used as a negative electrode collector.

In preparing Comparative Example 3, cells and a battery having the same electrode configuration and the same number of layers were prepared as in Example 6 except that a Cu/PET/Cu foil (thickness: 2 μm/6 μm/2 μm) was used as a negative electrode collector.

Figure 7:
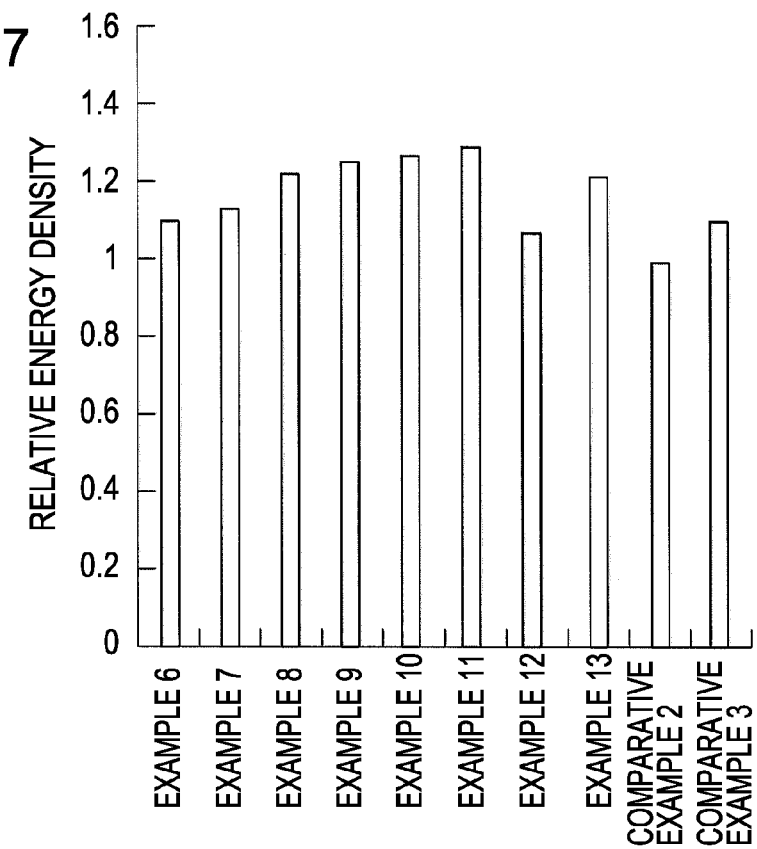
FIG. 7 is a graph showing the relative energy density of each of the batteries of Examples 6 to 13 and Comparative Examples 2 and 3.
Figure 8:
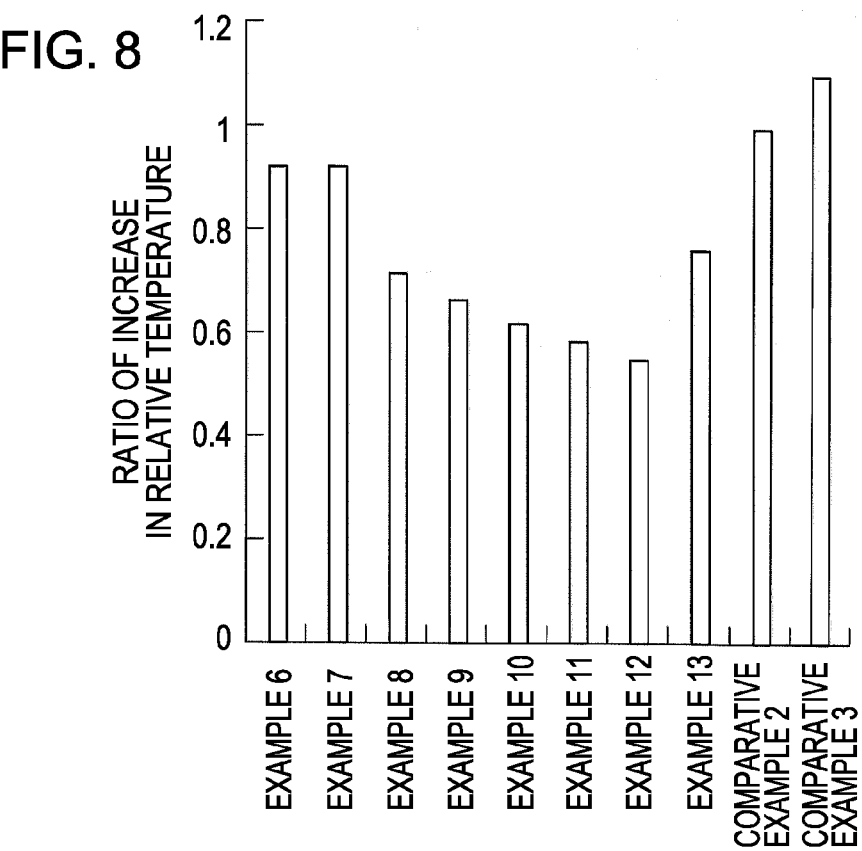
FIG. 8 is a graph showing a ratio of an increase in relative temperature of the batteries of Examples 6 to 13 and Comparative Examples 2 and 3.

A short circuit test to measure capacity was performed. Each of the batteries of Examples 6 to 13 and Comparative Examples 2 and 3 was assembled and initially charged at 0.5 C after the assembly and aged in a full charge state (4.2 V). The capacity was then measured at a rate of 1 C. The battery was then discharged at 100 C, and the cell surface temperature during the discharge was measured with a thermocouple attached on the central portion of the outer package, i.e., the position indicated by G in FIG. 2. The results are shown in Table 2 below. FIG. 7 is a graph showing the relative energy density, and FIG. 8 shows a graph showing the ratio of increase in relative temperature.

To confirm whether burn out, or rupture, occurred in the metal layers, each of the batteries of Examples 6 to 13 and Comparative Examples 2 and 3 was checked to determine whether it could be charged and discharged again after the discharging at 100 C described above. The batteries and cells were then disassembled to confirm whether burn out (rupture) occurred in the collector foils.

It was confirmed that, in all Examples, burn out occurred and non-conduction portions were formed in portions near the shorted portions of the collector. In contrast, in the batteries of Comparative Example 2 and 3, although portions near the shorted portions of the aluminum foils were burned out and the flow of current to the shorted portions of the aluminum foils was blocked, portions near the shorted portions of the copper foils were not burned out.

TABLE 2

|  | Positive electrode collector Al layer (μm) | Negative electrode collector | | Relative energy density | Relative temperature increase | Occurrence of rupture in collector |
|---|---|---|---|---|---|---|
|  |  | Cu layer (μm, total of both sides) | Reinforcing layer (μm) |  |  |  |
| Example 6 | 20 | 6 | 4 | 1.10 | 0.92 | Occurred in positive and negative electrodes |
| Example 7 | 20 | 5 | 5 | 1.13 | 0.92 | Occurred in positive and negative electrodes |
| Example 8 | 20 | 2 | 8 | 1.22 | 0.72 | Occurred in positive and negative electrodes |
| Example 9 | 20 | 1 | 9 | 1.26 | 0.67 | Occurred in positive and negative electrodes |
| Example 10 | 20 | 0.6 | 9.4 | 1.27 | 0.62 | Occurred in positive and negative electrodes |
| Example 11 | 20 | 0.2 | 9.8 | 1.29 | 0.58 | Occurred in positive and negative electrodes |
| Example 12 | 20 | 0.1 | 9.9 | 1.07 | 0.55 | Occurred in positive and negative electrodes |

TABLE 2-continued

|  | Positive electrode collector Al layer (μm) | Negative electrode collector Cu layer (μm, total of both sides) | Reinforcing layer (μm) | Relative energy density | Relative temperature increase | Occurrence of rupture in collector |
|---|---|---|---|---|---|---|
| Example 13 | 20 | 2 | 8*) | 1.22 | 0.77 | Occurred in positive and negative electrodes |
| Comparative Example 2 | 20 | 10 | — | 1 | 1 | Occurred in positive electrode only |
| Comparative Example 3 | 20 | 4 | 6* | 1.10 | 1.10 | Occurred in positive electrode only |

*The constituent material of the reinforcing layer was polyethylene terephthalate (PET) in Example 13 and Comparative Example 3 and polyimide in all examples.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A cell comprising:
a power-generating element including a plurality of unit cell layers, and an outer package configured for packaging the power generating element, each unit cell layer comprising:
a first electrode having a first collector;
a second electrode having a second collector; and
an electrolyte layer disposed between the first electrode and the second electrode, wherein the first collector has a first thickness and a first melting temperature and the second collector has a second thickness and a second melting temperature, the first thickness being greater than the second thickness and the first melting temperature being less than the second melting temperature is configured to form a short circuit between the first collector and the second collector with a conductor when a conductor from outside the cell penetrates the first collector and the second collector of at least one of the plurality of unit cell layers with the conductor having a shorted portion of the first collector fuses from heat generated by the short circuit before a temperature of the unit cell layers reaches a predetermined value so that the short circuit is blocked.

2. The cell according to claim 1 wherein the first collector is aluminum and the second collector is copper.

3. The cell according to claim 2 wherein the thickness of the first collector is 1 to 26 μm and the thickness of the second collector is 1 to 9 μm.

4. The cell according to claim 2 wherein the thickness of the first collector is less than 4 μm and the thickness of the second collector is less than 2 μm.

5. The cell according to claim 1, wherein the cell is a lithium ion secondary cell.

6. The cell according to claim 1, wherein the second collector includes at least one metal layer and a reinforcing layer.

7. The cell according to claim 6 wherein a thickness of the reinforcing layer is configured such that fusion of the shorted portion of the second collector occurs before the temperature of the unit cell layers reaches the predetermined value.

8. The cell according to claim 7 wherein the first collector is aluminum and the at least one metal layer of the second collector is copper.

9. The cell according to claim 8 wherein the thickness of the first collector is 1 to 26 μm and the thickness of the second collector is 1 to 9 μm.

10. The cell according to claim 8 wherein the thickness of the first collector is less than 4 μm and the thickness of the second collector is less than 2 μm.

11. The cell according to claim 7 wherein the reinforcing layer is a resin.

12. The cell according to claim 11 wherein the resin is polyimide or polyethylene terephthalate.

13. The cell according to claim 10 wherein the cell is a lithium ion secondary cell.

14. A battery unit comprising: a plurality of cells connected in series through connecting terminals, each cell including a power generating element and an outer package configured for packaging the power generating element, wherein adjacent cells are connected through a connecting terminal exterior to the outer package, each cell comprising:
a first electrode having a positive electrode collector and a second electrode having a negative electrode collector, wherein the positive collector has a thickness greater than a thickness of the negative collector and a melting temperature less than the melting temperature of the negative collector is configured to form a short circuit between the unfused electrode collector from each of the cells through the connecting terminal when a conductor from outside the cell penetrates at least two of the plurality of cells connected in series fusing one of the positive and negative electrodes collectors from each of the cells, wherein each shorted portion of the unfused electrode collectors fuse from heat generated by the short circuit before a temperature of the cells reaches a predetermined value so that the short circuit is blocked.

15. A vehicle comprising the battery unit according to claim 14 as a motor-driving power source.

16. The battery unit according to claim 14 wherein the short circuit is formed by a conductor having a diameter of 3 mm.

17. The battery unit according to claim 14 wherein the unfused electrode is a negative electrode.

* * * * *